US007949539B1

(12) United States Patent  
Mitchell et al.

(10) Patent No.: US 7,949,539 B1  
(45) Date of Patent: May 24, 2011

(54) DOCUMENT AUDIT ANALYSIS SYSTEM AND METHOD

(75) Inventors: Michael T. Mitchell, Worthington, OH (US); Denise A. Davidenko, Glen Ellyn, IL (US)

(73) Assignee: The Standard Register Company, Dayton, OH (US)

( * ) Notice: Subject to any disclaimer, the term of this patent is extended or adjusted under 35 U.S.C. 154(b) by 3408 days.

(21) Appl. No.: 10/224,840

(22) Filed: Aug. 21, 2002

(51) Int. Cl.  
*G06Q 10/00* (2006.01)

(52) U.S. Cl. ............................................. 705/1.1

(58) Field of Classification Search .......... 705/1, 1.1  
See application file for complete search history.

(56) References Cited

U.S. PATENT DOCUMENTS 5,953,702 A * 9/1999 Ohlemacher et al. ............ 705/1  
2003/0188036 A1 * 10/2003 Chen et al. .................. 709/310

* cited by examiner

*Primary Examiner* — Naresh Vig  
(74) *Attorney, Agent, or Firm* — Dinsmore & Shohl LLP (57) ABSTRACT

A document audit system includes a digital controller, a document data entry device, and a document report generator. The document data entry device is in communication with the digital controller. The document report generator is in communication with the digital controller. The digital controller is programmed to cause characteristic document data indicative of the characteristics of each of a plurality of selected documents to be received, compare the characteristic document data for each document to migration data metrics which specify the characteristic document data of documents that can appropriately be assigned to one of a plurality of migration categories, save the identities of the documents having characteristic document data that meet document data specified by the migration data metrics for the one of the plurality of migration categories, and enable the document report generator to generate a migration report. The migration report lists the identities of the documents having characteristic document data that meet document data specified by the migration data metrics for the one of the plurality of migration categories.

26 Claims, 9 Drawing Sheets

Document Usage:

| | |
|---|---|
| Vendor: [          ] | Internal Document: ○ |
| Monthly Usage/Ea: [       ] [Yearly] | External Document: ○ |
| Last Price Paid: [          ] | Enterprise Wide: ☐ |
| Quantity Per Pack: [          ] | Logos: ☐ |
| Packs Per Carton: [          ] | Obsolete: ☐ |
| Unit of Issue: [          ▼] | Critical Form: ☐ |

Document Features:

| | |
|---|---|
| Bar Code: ☐ | Carbon: ☐ |
| Carbonless: ☐ | Current Logo: ☐ |
| Die Cuts: ☐ | File Holes: ☐ |
| Label Affixed: ☐ | MICR-Consec.: ☐ |
| MICR-Repetitive: ☐ | Perforations: ☐ |
| Photocopy: ☐ | Re-moist: ☐ |
| Secure Document: ☐ | Transfer Tape: ☐ |

Custom Fields:

| | |
|---|---|
| Color of Logo: [        ▼] | Revisions needed? ☐ |
| Document Owner: [          ] | |

FIG. 5

Document Usage

| | | | |
|---|---|---|---|
| Project #: <display project #> | CCN: <display CCN> | Customer Name | <display Customer Name> |
| Form Number | <display form number> | Form Name | <display form name> |

Inventory Info

| | | | |
|---|---|---|---|
| Annual Usage. | | Quantity Stored | |
| Quantity on Hand | | Units Stored | |
| Qty/Unit of Issue | | Reorder Point | |
| Order Number | | Billing U/M | [▼] |
| Price List | | Billing U/M Quantity | |
| | | | |
| Number of Months Lead | | ☐ Release First | |
| Indicator Code | | ☐ Global Product | |
| Primary/Secondary Sort | [▼] | ☐ Confidential | |
| Function | [▼] | ☐ Consecutive Number | |
| MWP Override | | Remarks | |
| Max Release Unit | | | |

[Save]

DOCUMENT AUDIT ANALYSIS SYSTEM AND METHOD

CROSS REFERENCE TO RELATED APPLICATIONS

None.

STATEMENT REGARDING FEDERALLY SPONSORED RESEARCH OR DEVELOPMENT

Not applicable.

BACKGROUND OF THE INVENTION

The present invention relates to the production, design, and maintenance of business forms within a document management system. In order to produce, design, and maintain a group of forms for a particular business, it is often desirable to evaluate periodically the forms used by the business. This evaluation process is intended to produce a new portfolio of business forms that are tailored for the specific, current needs of the business. The new business form portfolio may represent, for example, a streamlined business form inventory, a more comprehensive business form inventory, a more cost-effective business form inventory, or combinations thereof. Further, it is highly desirable that the business forms be available for use in the best format (e.g., electronic, commercially printed, printed at the user's desk, printed on demand at a somewhat larger print facility, and the like). The new business form portfolio may include one or more forms which are the same as those which were used previously, except that the formats of these forms have been changed or migrated.

The conventional method of evaluating business forms involves the collection of a sample of each form used by the company. The sample forms are usually gathered from a central warehouse and grouped together, for example in one or more three ring binders. The entire collection of business forms is then evaluated as a group by a technician who manually pages through the binders. Evaluation notes are typically manually recorded, and become the basis for producing a new collection of business forms which fill the needs of the business more appropriately.

In the conventional evaluation process, it is difficult to examine and review the characteristics of the entire group of forms, because it is not possible to view information from more than a few forms simultaneously. For example, if a technician wishes to evaluate and compare the names of all the forms, it is necessary to page through the binder quickly, reading the form names while keeping the previously read form names in mind. Similarly, if the technician wishes to examine the collective functions of the forms, he must page through the binder and individually ascertain the function of each form. This form by form approach is inefficient, as a result of its manual nature, and is inaccurate because it is easy to skip forms inadvertently and to overlook form information while paging through the binder. This inaccuracy and inefficiency becomes exaggerated as the number of forms within the binder and the number of binders holding the forms increase.

The conventional method of evaluation is also undesirable because every time an analysis technician wishes to evaluate a previously unexamined aspect of the forms, it is necessary to return to the group of forms in the binder and resume the page-by-page approach described above. Similarly, if a new form is added to the group of forms, in order to compare the new form to the existing forms, it is also necessary for the technician to return to the page-by-page review process. Thus, the conventional method does not provide a catalog of form information that can be updated easily. Further, analysis of the form portfolio with respect to migration, that is, changing the type or category of the form (e.g., from a commercially printed paper form to an electronic form), has been largely a subjective process that is based on the individual technician's view of the type of form that might best meet the needs of the company for the particular application.

U.S. Pat. No. 5,953,702, issued Sep. 14, 1999, to Ohlemacher et al, assigned to the assignee of the present application, discloses a computerized document audit system. In the Ohlemacher system, a database is built by entry of a number of fields of information for each document used by a company. Reports are generated from this database, with the data being sorted by any field or fields in virtually any manner desired. While providing a significant aid to the analysis process, the Ohlemacher et al system did not provide a means by which the analysis of documents with respect to possible migration to other document categories could be effected.

Accordingly, there is a need for a comprehensive document audit system and a process for generating a migration report, listing the identities of the documents that are likely candidates for change to differing document categories.

SUMMARY OF THE INVENTION

This need is met by the present invention which provides a document audit system and method for generating a migration report. The migration report lists the identities of documents that have characteristic document data which suggest that change to a different document category may be desirable. The system and method are implemented by a system that includes a digital controller, a document data entry device in communication with the digital controller, and a document report generator in communication with the digital controller. The digital controller is programmed to cause characteristic document data indicative of the characteristics of each of a plurality of selected documents to be received, to compare the characteristic document data for each document to migration data metrics which specify the characteristic document data of documents that can appropriately be assigned to one of a plurality of migration categories, to save the identities of the documents having characteristic document data that meet document data specified by the migration data metrics for the one of the plurality of migration categories, and to enable the document report generator to generate a migration report. The migration report lists the identities of the documents having characteristic document data that meet document data specified by the migration data metrics for the one of the plurality of migration categories.

The data entry device preferably comprises a computer terminal. The report generator preferably comprises a printer, with the digital controller programmed to enable the printer to print a migration report for the migration category. Alternatively, the report generator may comprise a computer display screen. Further, the report generator may comprise a data output port coupled to a document management system, or a report content selector coupled to the digital controller.

The migration data metrics which specify the characteristic document data of documents that can appropriately be assigned to one of a plurality of migration categories include document data specifying document volume. The migration data metrics may also include document data specifying document type, and document data specifying document construction. The document construction may include at least one of the following: (i) the length and width of the document, (ii) the number of plies included in the document, (iii) the presence or absence of a carbon ply in the document, (iv) the presence of back printing in the document, (v) the presence of perforations in the document, (vi) the presence of file holes in the document, (vii) the number of ink colors or paper colors utilized in the document, and (viii) the weight of the paper utilized in the document.

The migration data metrics which specifies the characteristic document data of documents that can appropriately be assigned to one of a plurality of migration categories may include custom document data, the nature of which is determined by the user of the system.

The digital controller may be further programmed to cause the sorted document data to be imported from or exported to a companion comprehensive document audit system. The digital controller may also be programmed to cause the characteristic document data to be imported from or exported to a data file.

A method of generating a document migration report identifying those documents in a group of documents that may be candidates for use in at least one of a plurality of migration categories, includes the step of providing migration data metrics that have a range of characteristic document data for each of a plurality of characteristics for at least one of a plurality of migration categories. The method further includes the step of assigning characteristic document data for each of the plurality of characteristics for each document in a group of documents. The method further includes the step of comparing characteristic document data for each document in the group of documents to the migration data metrics to determine the identities of those documents having characteristic document data that fall within the ranges specified by the migration data metrics for the one of the plurality of migration categories. The method further includes the step of saving the identities of those documents having characteristic document data that fall within the ranges specified by the migration data metrics for the one of the plurality of migration categories. Finally, the method includes the step of generating a migration report listing the identities of those documents having characteristic document data that fall within the ranges specified by the migration data metrics for the one of the plurality of migration categories.

The step of providing migration data metrics may include the step of providing a range of data with respect to document volume. The step of providing migration data metrics may include the step of providing a range of data with respect to document type. The step of providing migration data metrics may include the step of providing a range of data with respect to document construction. Finally, the step of providing migration data metrics may include the step of providing a range of data which is custom determined by the user of the system.

The assigning step may comprise entering the characteristic document data at a computer terminal. The generating step may comprise generating the migration report as a display on a computer display screen. Alternatively, the generating step may comprise generating the migration report as a computer print-out. Further, the generating step may comprise generating the migration report as a data input to a document management system.

The document construction information may comprise data indicative of at least one of the following: (i) the length and width of the document, (ii) the number of plies included in the document, (iii) the presence or absence of a carbon ply in the document, (iv) the presence of backprinting in the document, (v) the presence of perforations in the document, (vi) the presence of file holes in the document, (vii) the number of ink colors or paper colors utilized in the document, and (viii) the weight of the paper utilized in the document.

Accordingly, it is an object to provide a computer system and method for analyzing a document portfolio and providing a report that suggests changes in document category; to provide such a computer system and method in which document data indicative of the characteristics of each document is compared to migration metrics; and to provide such a computer system and method in which the migration metrics may be customized by the user.

Other objects and advantages of the invention will be apparent from the following detailed description, the accompanying drawings, and the appended claims.

DETAILED DESCRIPTION OF THE INVENTION

Figure 1:
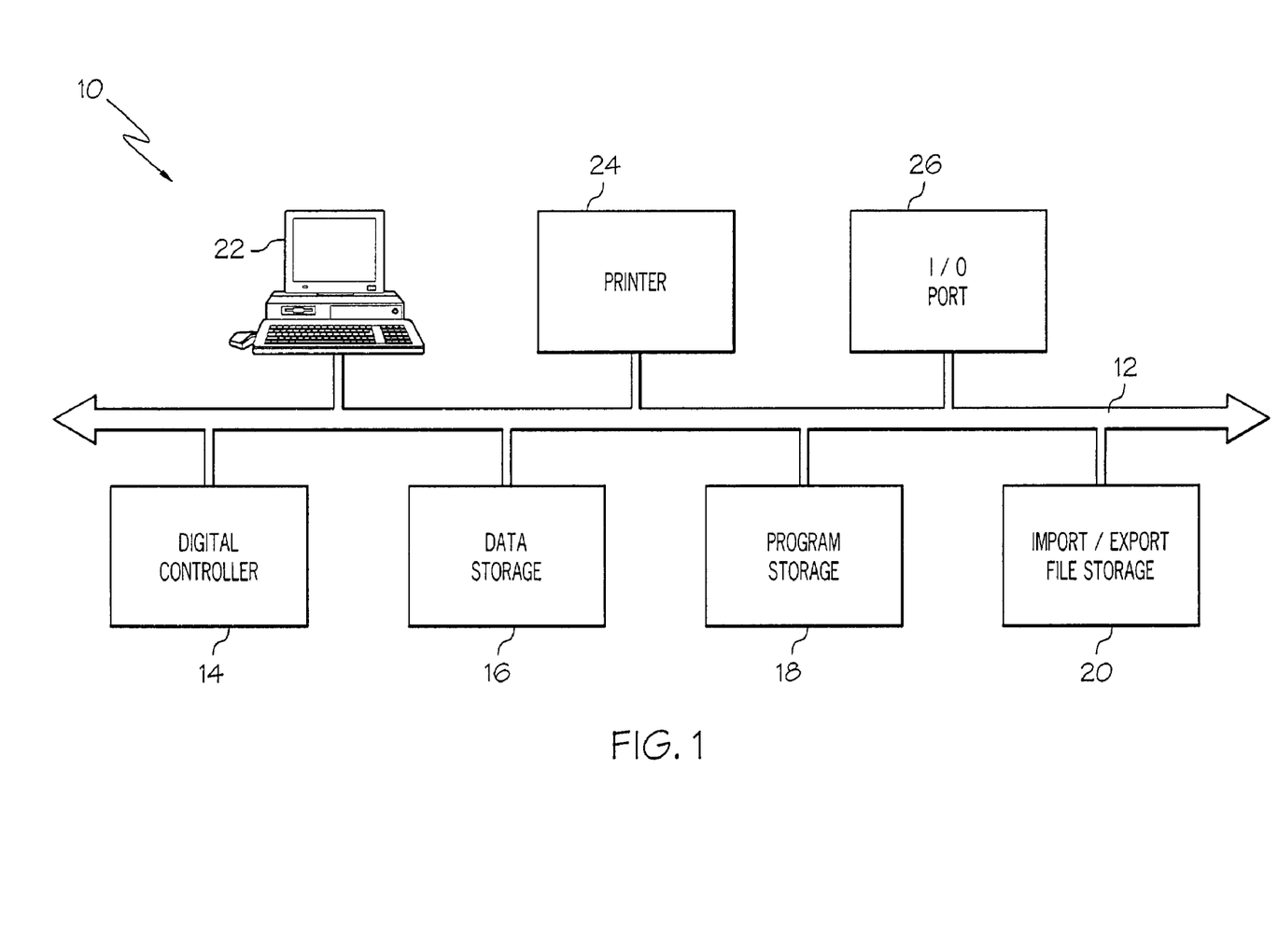
FIG. 1 is a block diagram of the components of a document audit system in accordance with the present invention.

FIG. 1 illustrates the electronic components of a document audit and analysis system (DAA) 10. The overall operation of the DAA 10 is controlled by a digital controller 14, most commonly a digital central processing unit (CPU). The digital controller 14, includes data, address, and control buses, represented generally by the bus 12. A computer terminal 22, a printer 24, an input/output port (I/O port) 26, and an import/export file storage device 20 are connected to the digital controller 14, and are controlled thereby according to the operating program resident in a digital program storage device 18. The import/export file storage device 20 is typically a peripheral storage device wherein data is saved on floppy disks or compact disks, but could be any file storage device which saves and enables transfer of data files. The program storage device 18 is connected to the digital controller 14 via the bus 12. The DAA 10 also includes data storage device 16 connected to the digital controller 14 by the bus 12 for providing storage of data processed by the digital controller 14. It is contemplated by the present invention that the program storage device 18 and the data storage device 16 may comprise a single digital memory in communication with the digital controller 14. It is further contemplated by the present invention that the data storage device 16 may comprise a network server in communication with the digital controller 14, and in communication with digital controllers of other DAA systems (not shown). In this manner, a plurality of DAA systems can be provided in communication with a common database.

The terminal 22 typically comprises a computer keyboard, a computer display screen, and a mouse or other device for moving a cursor or other display indicia on the display screen. The terminal 22 may alternatively comprise any data entry device with which an operator can input data to be processed by the DAA operating program, e.g., a computer display screen user interface, or a voice activated data entry device.

Figure 4:
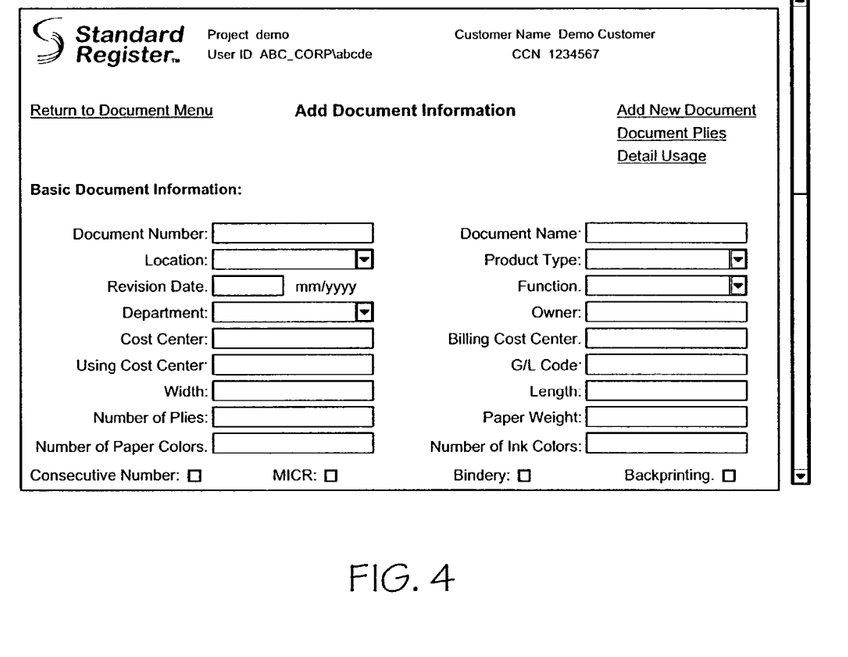
FIG. 4 is a drawing depicting a computer screen provided by the system to allow document specifications to be inputted.

In the preferred method of operating the DAA, one or more technicians collect a group of documents, assign characteristic document data to documents within the group, and identify characteristic document data for each document. Characteristic document data assigned to the document includes data that represents the physical construction of the document. For example, the physical construction data includes data indicative of the length and width of the document, the number of plies included in the document, the presence or absence of a carbon ply in the document, the presence and respective positions of backprinting, perforations, or file holes in the document, the number of ink colors or paper colors utilized in the document, and the weight of the paper utilized in the document. Preferably, the assigned document characteristic information is any type of document information which is not already present on a selected document, and preferably includes, for example, a document name, a department code, a function code, cost center codes and the like. FIG. 4 illustrates a computer screen which is displayed on the monitor of terminal 22 and which facilitates the entry of this data.

If a document name, or form name, is present on the form, that name is preferably used as the document name for data input. If no name is associated with the document, the DAA operator assigns an appropriate form name. Similarly, all documents collected without a form number will have a form number assigned thereto. Preferably, form numbers are taken consecutively from a predetermined block of form numbers. A department code and a function code, derived from document use criteria, are also assigned to each form.

The characteristic document data may include the assigned data and information corresponding to:
(1) document identification information;
(2) document physical characteristics information;
(3) document storage information;
(4) document distribution information;
(5) document usage information;
(6) form function information; and
(7) form revision information.

The DAA 10 prompts the system operator, via terminal 22, to enter characteristic document data, including the assigned data, at terminal 22. Characteristic document data may also be entered at I/O port 26 or retrieved from import/export file storage 20. The data entry format established by the DAA 10 allows the digital controller 14 to identify the document from which the characteristic document data originated and separate the characteristic document data for each document into a plurality of data fields. A display screen user interface is a preferred data entry format.

The data fields corresponding to the characteristic data for each document may vary from document to document; however, all documents will include characteristic data corresponding to at least one common data field and may include characteristic data corresponding to a plurality of common data fields. For example, each document will include a form name corresponding to a form name data field while every document may not include a revision date corresponding to a revision date data field.

The digital controller 14 is programmed to cause document data entered at terminal 22 to be carried along the bus 12 and sorted according to the preselected data fields. The characteristic data for each document sorted into preselected data fields in this manner is saved in the data storage device 16 according to the preselected data fields.

A document field report is generated by selecting a group of report data fields from the preselected data fields identified in the data storage device 16. This selection is accomplished through the use of a keyboard, mouse, and/or a computer display user interface included at the terminal 22, which may constitute a report content selector. The selected report data fields and the documents having characteristic data corresponding to the selected report data fields determine the report content. Each selected report data field and the characteristic data of each document corresponding to each selected report data field is represented on the document field report. It is contemplated by the present invention that a field report may comprise a single report data field or a plurality of data fields. Standard field reports, having preselected report data fields, are preferably established within the operating program of the DAA 10. Additionally, custom field reports, having report data fields as selected by the system operator, may be established within the operating program of the DAA 10.

It is preferable to arrange the field report in columnar format wherein each column corresponds to a report data field and each row corresponds to characteristic document data. Further, for each report, a primary data field is selected and sorted so as to determine the order of the rows on the field report. According to one aspect of the present invention, sorted data corresponding to the selected data fields is sent to the printer 24 to provide the DAA operator with a document field report. Alternatively the document field report may be generated at a computer display screen.

A document management system (DMS) is capable of processing form data and producing an improved form portfolio from the processed form data. A variety of document management systems, including FORMPAC and PRISM, available from The Standard Register Company, Dayton, Ohio, are widely used and well known throughout the business forms industry. DMS input data is either produced by a DMS user observing a DMS input field report, or produced by the DAA, sent to the I/O port 26, and input directly into a DMS via a digital data connection.

Figure 2:
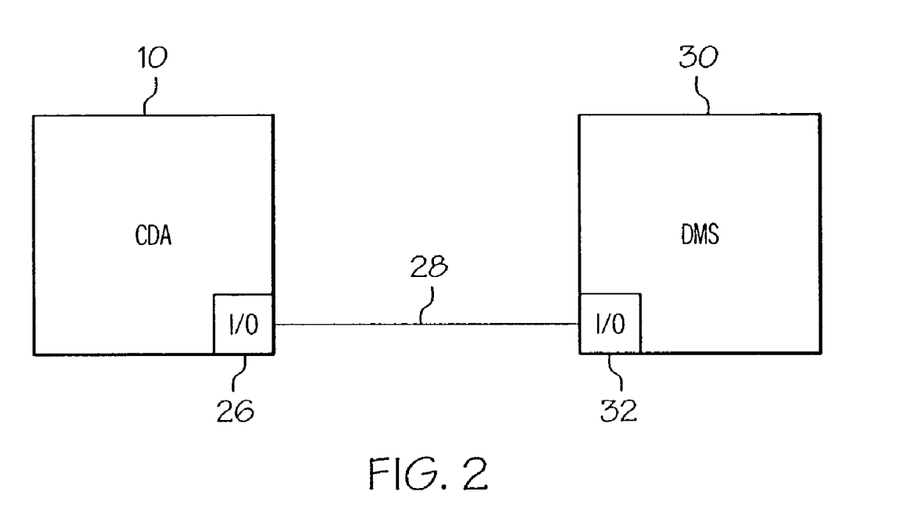
FIG. 2 is a block diagram of a document audit system coupled to a document management system in accordance with the present invention.

A direct DMS digital data connection is illustrated in FIG. 2. As is illustrated in FIG. 2, where like elements are represented by like reference numbers, a document field report is exported as digital data to a document management system 30 via I/O port 26, data connection 28, and I/O port 32. The DMS 30 contains operational software and equipment for designing and producing customized forms.

Figure 3:
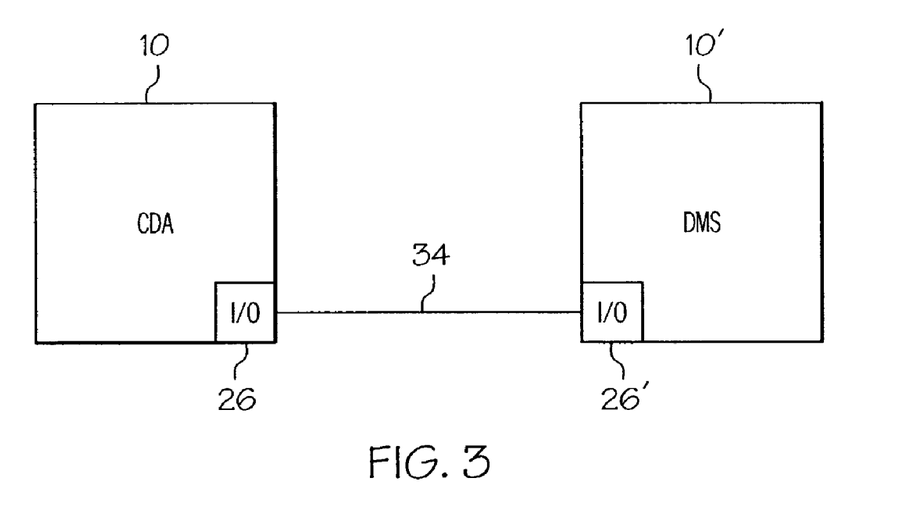
FIG. 3 is a block diagram of a document audit system coupled to a companion document audit system in accordance with the present invention.

According to yet another aspect of the present invention shown in FIG. 3, sorted data corresponding to the selected data fields may be exported to or imported from a companion DAA 10' via I/O ports 26 and 26'. As is illustrated in FIG. 3, where like elements are represented by like reference numbers, sorted data is exported along data connection 34 to a companion DAA 10' equipped with an I/O port 26'. Alternatively, sorted data may be saved on a floppy disk or other data file storage device in the import/export file storage unit 20 and transferred among DAA systems through file copying. In this manner characteristic document data can be shared and consolidated among a plurality of document audit systems. It is contemplated by the present invention that data may also be exported to or imported from a database via I/O port 26.

Figure 5:
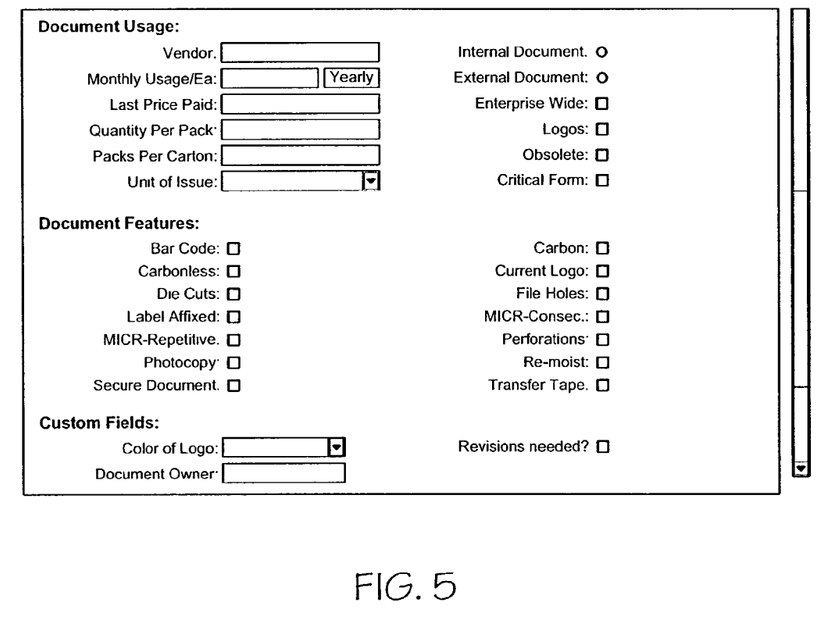
FIG. 5 is a drawing depicting a computer screen provided by the system to allow document usage to be inputted.

FIGS. 4 and 5 illustrate document specification screens that permit the entry of characteristic document data relating to the specifications of a document of the portfolio being analyzed. From these screens a technician can add information with respect to a new document, modify an existing document or delete a document.

The document specification screen contains all of the details of the document. These include the document number, the document name, the product type (e.g., cut sheet, carbonless set, or continuous), revision date, the business function of the document, the department in which it is used, the owner of the document, the cost center that is assigned to the owner of the document, the billing cost center (the cost center assigned financial responsibility for the product, the using cost center (the cost center that is assigned to the group that uses the document). The details further include the width, length, number of plies, paper weight, number of paper colors, number of ink colors, whether these documents are consecutively numbered, whether the document is MICR printed, fastening information, and document features. The details additionally include usage information such as the identity of the vendor that originally produced the product, whether the company used document internally or externally, whether the document is used throughout the company, whether the document bears any logos, whether the document is obsolete, whether the document is critical to the company, the estimated average monthly usage, the actual sell price, the shipping unit of issue.

Figure 6:
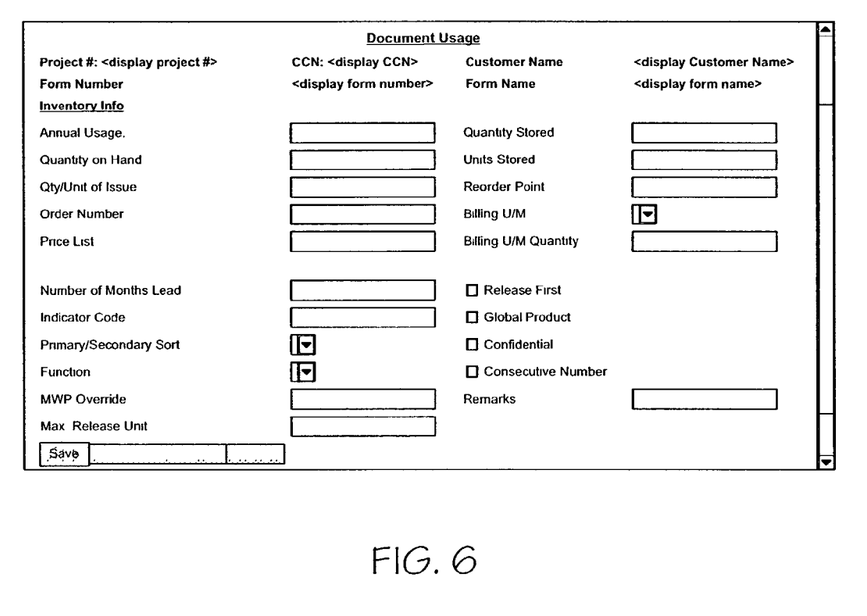
FIG. 6 is a drawing depicting a computer screen provided by the system to allow document usage to be inputted.

FIG. 6 illustrates a document usage screen that allows the technician to enter document specific information regarding the usage of the document.

The data relating to usage is not needed for every document entered into the system. The data entered includes annual usage, quantity on-hand, the quantity per unit of issue, the order number, the list price, the quantity stored, the units stored, the point where reorder notices are to be printed, billing unit of measure, the number of eaches in a billing unit, the number of months to be on hand when the reorder notice is generated, and the business function of the document.

Figure 7:
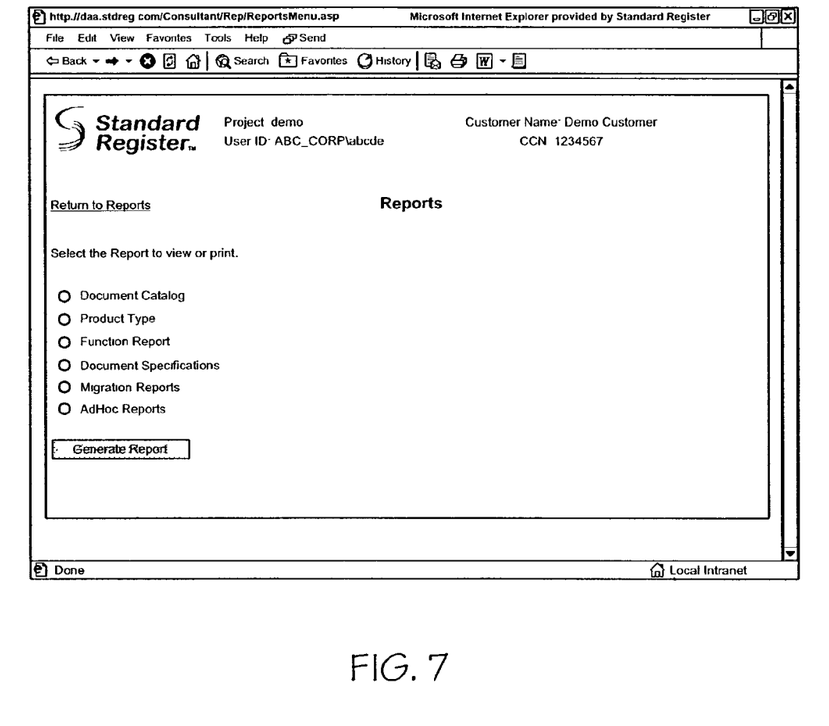
FIG. 7 is a drawing depicting a computer screen provided by the system to allow the desired report to be inputted.

FIG. 7 shows a report selection screen. The DAA system can prepare and display or print any of a series of standard reports. The reports listed on the screen shown in FIG. 7 are all standard reports, with the exception of the "Ad Hoc" report. If the Ad Hoc report is selected, then the parameters of the report are selected on a subsequent screen.

Figure 8:
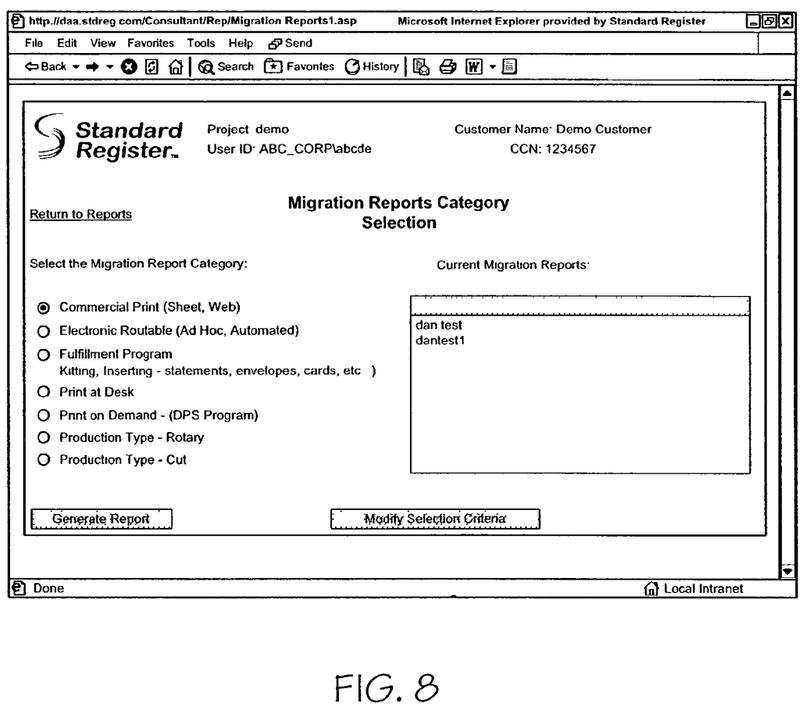
FIG. 8 is a drawing depicting a computer screen provided by the system to allow a migration category to be selected.
Figure 9:
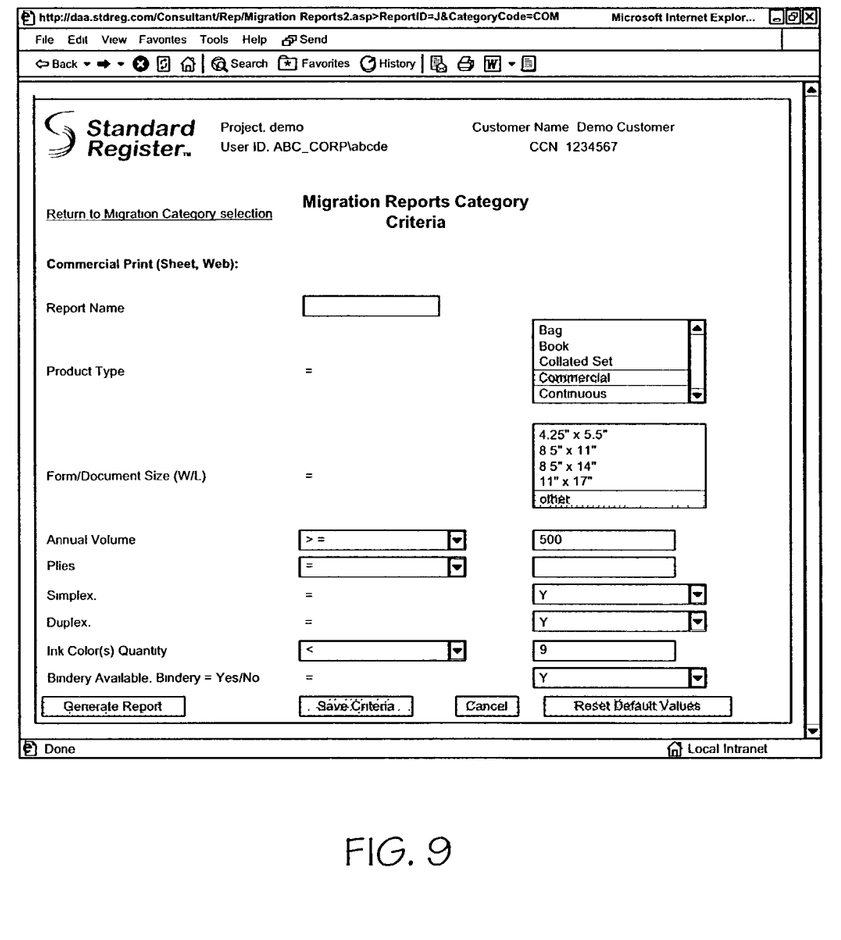
FIG. 9 is a drawing depicting a computer screen provided by the system to allow migration metrics parameters to be inputted.

Among the standard reports available on the screen of FIG. 7 is a "Migration Report." The Migration Report lists those documents that meet the criteria for consideration for change to a different type of document. FIG. 8 illustrates the migration reports category selection screen. This screen is used by the technician to select the migration category for which the report is to be prepared. The report produced in response to an entry in this screen will list those documents that meet the criteria for documents to be considered for migration to the document type selected. These criteria are in a database stored in storage 16, and initially are set at default values. If the technician wishes to modify these default values to produce migration reports using different criteria, then new criteria are entered by the technician using the criteria entry screen depicted in FIG. 9. The migration reports category criteria selection screen displays the default values for the category selected. The technician can modify the selection criteria and generate the migration report. If the technician has selected custom Criteria, the selection criteria are saved to the database and are retrieved each time the technician comes to this screen.

Figure 10:
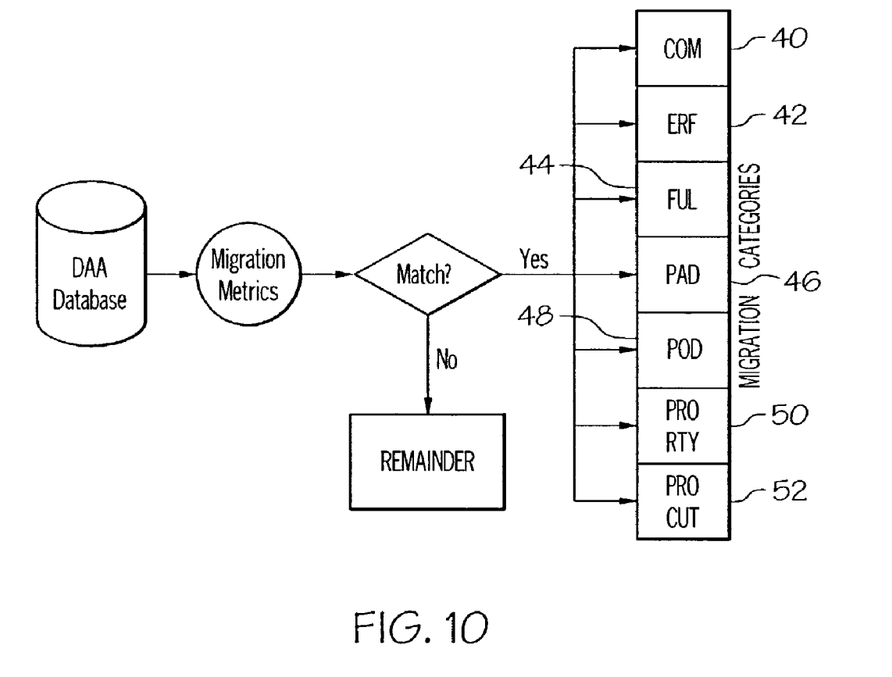
FIG. 10 is a drawing diagrammatically depicting the migration report generation process.

FIG. 10 shows diagrammatically the process by which the migration report is developed. In the migration sort operation, the data is effectively reduced, eliminating all of the documents in the DAA database that cannot be applied to the migration potential categories. The migration metrics model provides default values for comparison criteria, as set out above. The document database is applied to criteria such as product type, size, plies, and annual volume. The customer database created by the document audit process is filtered through the these metrics with a document-by-document comparison. As discussed above in respect to FIG. 9, the migration metrics default criteria may be changed, if desired. For example, the number of ink colors required for Print On Demand may be increased or eliminated, in order to expand the potential number of forms that may fit into this migration category. The final listing of forms that might be changed to a different form type is subjected to careful review.

FIG. 10 shows seven migration categories. It will be appreciated, however, that a greater or lesser number of categories may be utilized. Category 40 is for commercially printed forms, category 42 is for electronically routable forms, category 44 is for fulfillment forms, category 46 is for forms that are printed on a desktop printer, category 48 is for forms that are printed on demand, category 50 is for forms that are printed on a rotary press, and category 52 is for forms that are printed in a cut sheet form.

Having described the invention in detail and by reference to preferred embodiments thereof, it will be apparent that modifications and variations are possible without departing from the scope of the invention defined in the appended claims.

What is claimed is:

1. A document audit system comprising:
   a digital controller;
   a document data entry device in communication with said digital controller; and
   a document report generator in communication with said digital controller;
   wherein said digital controller is programmed to:
      cause characteristic document data indicative of the characteristics of each of a plurality of documents to be received,
      compare said characteristic document data for each of said plurality of documents to migration data metrics which specify the characteristic document data of documents that can appropriately be assigned to one of a plurality of migration categories,
      save the identities of those documents of said plurality of documents that have characteristic document data that meet document data specified by said migration data metrics for said one of said plurality of migration categories, and enable said document report generator to generate a migration report, listing the identities of those documents of said plurality of documents that have characteristic document data that meet document data specified by said migration data metrics for said one of said plurality of migration categories.

2. A system as claimed in claim 1, wherein said data entry device comprises a computer terminal.

3. A system as claimed in claim 1, wherein said report generator comprises a printer.

4. A system as claimed in claim 3, wherein said digital controller is programmed to enable said printer to print a migration report for said migration category.

5. A system as claimed in claim 1, wherein said report generator comprises a computer display screen.

6. A system as claimed in claim 1, wherein said report generator comprises a data output port coupled to a document management system.

7. A system as claimed in claim 1, wherein said report generator includes a report content selector coupled to said digital controller.

8. A system as claimed in claim 1, in which said migration data metrics which specify the characteristic document data of documents that can appropriately be assigned to one of a plurality of migration categories have document data specifying document volume.

9. A system as claimed in claim 1, in which said migration data metrics which specify the characteristic document data of documents that can appropriately be assigned to one of a plurality of migration categories have document data specifying document type.

10. A system as claimed in claim 1, in which said migration data metrics which specify the characteristic document data of documents that can appropriately be assigned to one of a plurality of migration categories have document data specifying document construction.

11. A system as claimed in claim 10 wherein said document construction for each document comprises at least one of the following: (i) the length and width of the document, (ii) the number of plies included in the document, (iii) the presence or absence of a carbon ply in the document, (iv) the presence of back printing in the document, (v) the presence of perforations in the document, (vi) the presence of file holes in the document, (vii) the number of ink colors or paper colors utilized in the document, and (viii) the weight of the paper utilized in the document.

12. A system as claimed in claim 1, in which said migration data metrics which specify the characteristic document data of documents that can appropriately be assigned to one of a plurality of migration categories have custom document data which are determined by the user of the system.

13. A system as claimed in claim 1, wherein said document data includes document identification information.

14. A system as claimed in claim 1, wherein said digital controller is further programmed to cause document data to be imported from or exported to a companion comprehensive document audit system.

15. A system as claimed in claim 1, wherein said digital controller is further programmed to cause said characteristic document data to be imported from or exported to a data file.

16. A method of generating a document migration report identifying those documents in a group of documents that may be candidates for use in at least one of a plurality of migration categories, comprising the steps of:
providing migration data metrics, said migration data metrics including a range of characteristic document data for each of a plurality of characteristics for at least one of a plurality of migration categories;
for each document in a group of documents, assigning characteristic document data for each of said plurality of characteristics;
comparing characteristic document data for each document in said group of documents to said migration data metrics to determine which of those documents having characteristic document data that fall within a range specified by said migration data metrics for said one of the plurality of migration categories;
saving the identities of those documents having characteristic document data that fall within the ranges specified by said migration data metrics for said one of said plurality of migration categories; and
generating a migration report listing the identities of those documents having characteristic document data that fall within the ranges specified by said migration data metrics for said one of said plurality of migration categories.

17. The method of claim 16 in which said step of providing migration data metrics includes the step of providing a range of data with respect to document volume.

18. The method of claim 16 in which said step of providing migration data metrics includes the step of providing a range of data with respect to document type.

19. The method of claim 16 in which said step of providing migration data metrics includes the step of providing a range of data with respect to document construction.

20. A method as claimed in claim 19, wherein said document construction information for each document comprises data indicative of at least one of the following: the length and width of the document, the number of plies included in the document, the presence or absence of a carbon ply in the document, the presence of backprinting in the document, the number of ink colors or paper colors utilized in the document, and the weight of the paper utilized in the document at issue.

21. The method of claim 16 in which said step of providing migration data metrics includes the step of providing a range of data which is custom determined by the user of the system.

22. The method as claimed in claim 16, wherein said assigning step comprises entering said characteristic document data at a computer terminal.

23. The method as claimed in claim 16, wherein said generating step comprises generating said migration report as a display on a computer display screen.

24. A method as claimed in claim 16, wherein said generating step comprises generating said migration report as a computer print-out.

25. A method as claimed in claim 16, wherein said generating step comprises generating said migration report as a data input to a document management system.

26. A method as claimed in claim 16, wherein said migration report indicates the possible document type changes for consideration.

* * * * *

UNITED STATES PATENT AND TRADEMARK OFFICE
CERTIFICATE OF CORRECTION

| | | |
|---|---|---|
| PATENT NO. | : 7,949,539 B1 | Page 1 of 1 |
| APPLICATION NO. | : 10/224840 | |
| DATED | : May 24, 2011 | |
| INVENTOR(S) | : Mitchell et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2733 days.

Signed and Sealed this
Twenty-sixth Day of July, 2011

David J. Kappos
*Director of the United States Patent and Trademark Office*